April 28, 1925.
A. WILD
1,535,193
AUTOMATIC WATER HEATER CONTROLLER
Filed Jan. 18, 1924  2 Sheets-Sheet 1
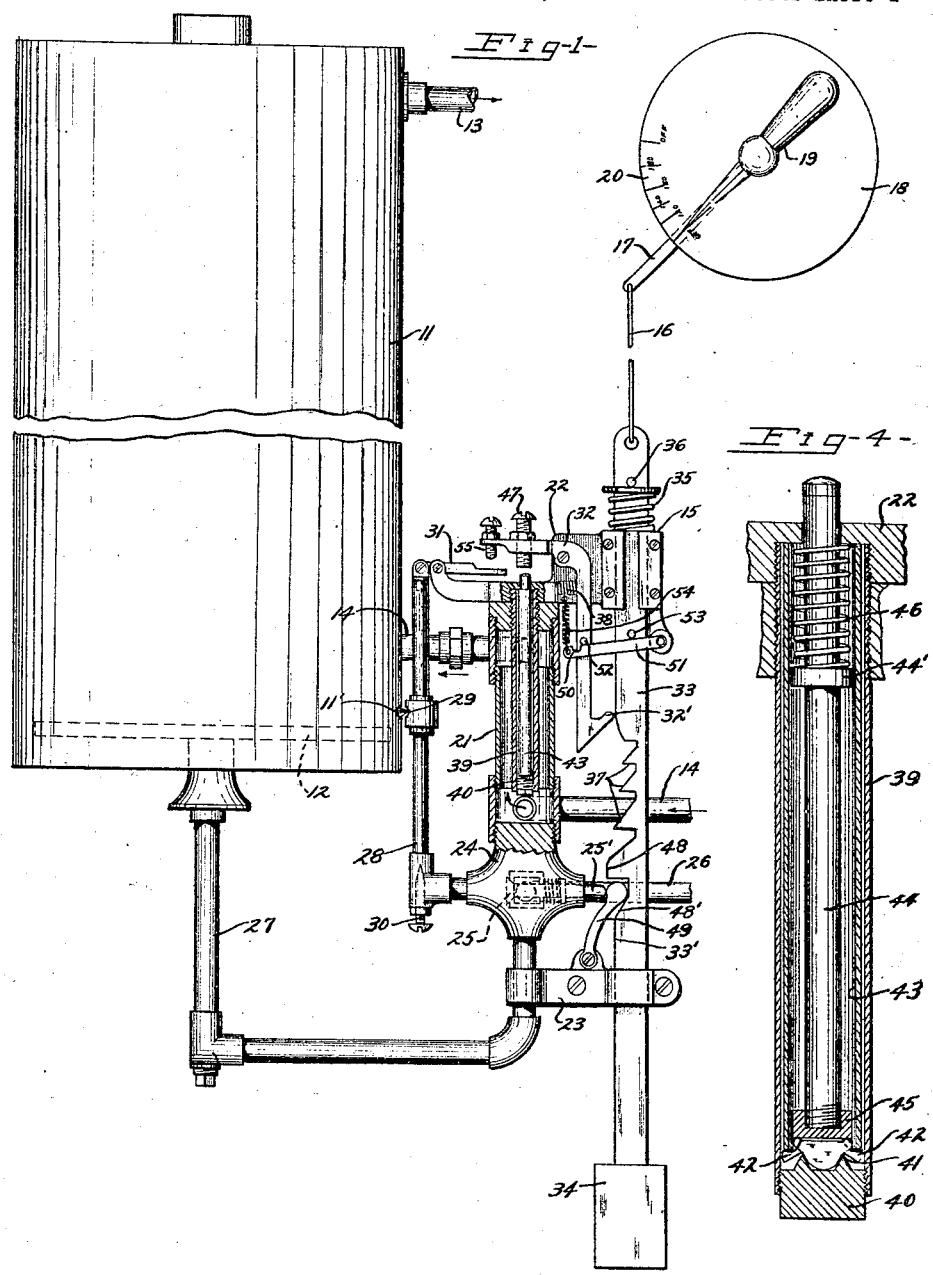
INVENTOR.
Alfred Wild
BY Morsell, Keeney & Morsell,
ATTORNEYS.

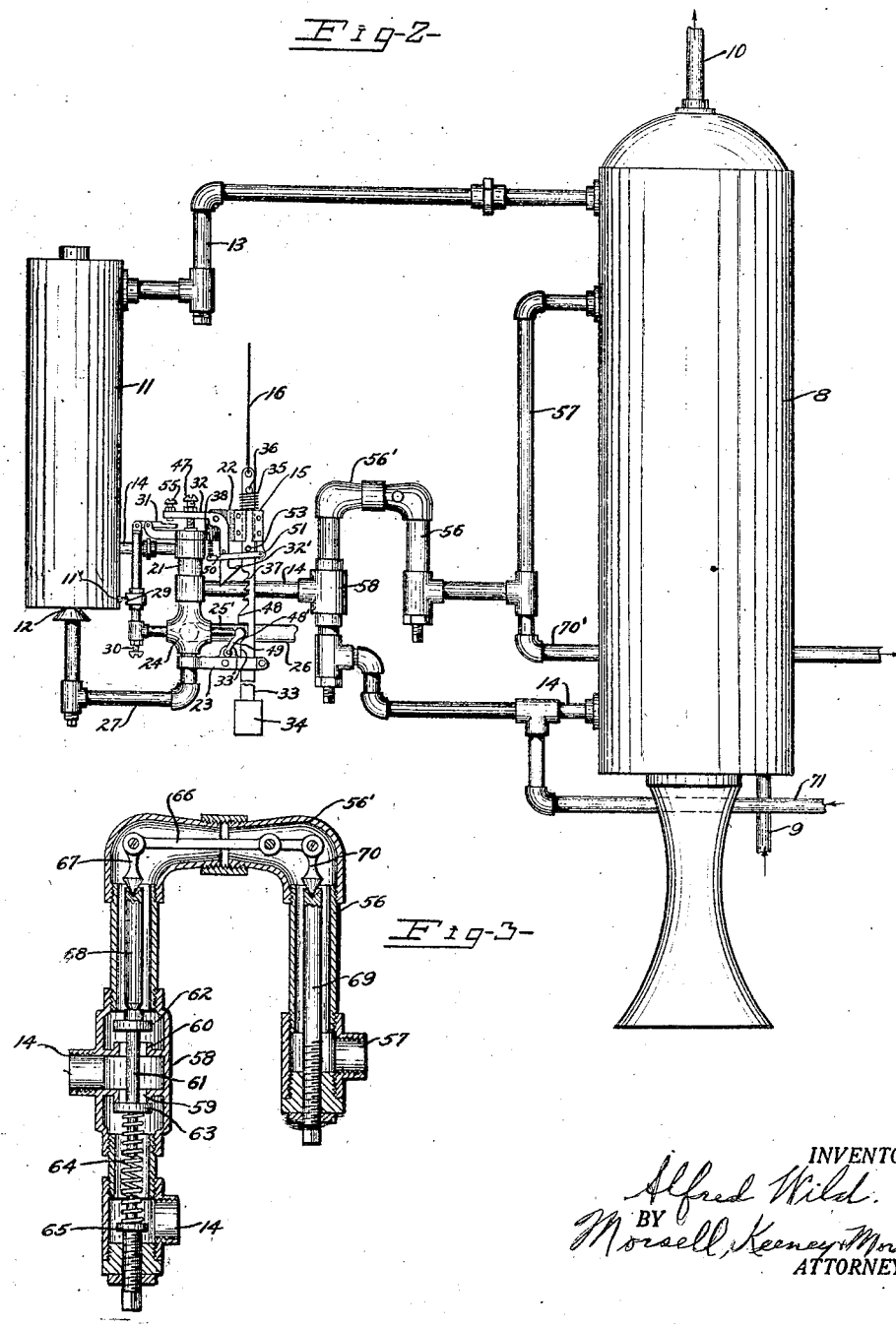

Patented Apr. 28, 1925.

1,535,193

UNITED STATES PATENT OFFICE.

ALFRED WILD, OF MILWAUKEE, WISCONSIN.

AUTOMATIC WATER-HEATER CONTROLLER.

Application filed January 18, 1924. Serial No. 687,116.

*To all whom it may concern:*

Be it known that I, ALFRED WILD, a citizen of Czechoslovakia, and resident of Milwaukee, in the county of Milwaukee and State of Wisconsin, have invented new and useful Improvements in Automatic Water-Heater Controllers, of which the following is a description, reference being had to the accompanying drawings, which are a part of this specification.

This invention relates to improvements in automatic water heater controller.

It is one of the objects of the present invention to provide an automatic water heater controller which may be operated and set from a point distant from the controller and when the temperature of the water is heated to the desired degree, the heat will be automatically turned off.

A further object of the invention is to provide an automatic water heater controller in which it will be impossible to set the controller with the main supply of gas turned on in case the pilot light is accidentally extinguished.

A further object of the invention is to provide an automatic water heater controller in which the main supply of gas may be closed off from a distant point independent of the automatic closing.

A further object of the invention is to provide an automatic water heater controller in which the water in the upper portion of the boiler to which the heater is connected will first be heated and when its temperature reaches a predetermined degree the circulation will be automatically changed to include all of the water in the boiler to heat the same.

A further object of the invention is to provide an automatic water heater controller which is mechanically operated from a distant point without the employment of electrical means.

A further object of the invention is to provide an automatic water heater controller in which the heat of the water flowing from the tank controls the supply of gas to the burner.

A further object of the invention is to provide an automatic water heater controller which is of simple construction, is strong and durable, and is well adapted for the purpose described.

With the above and other objects in view, the invention consists of the improved automatic water heater controller and its parts and combinations as set forth in the claims, and all equivalents thereof.

In the accompanying drawings in which the same reference characters indicate the same parts in all of the views:

Fig. 1 is a side view partly in section of the improved automatic water heater controller;

Fig. 2 is a side view of the automatic heater shown connected to a storage boiler;

Fig. 3 is a sectional detail view on a larger scale of the thermostatic device controlling the flow of water through the boiler; and Fig. 4 is a sectional detail view on a larger scale of the thermostatic device controlling the main flow of gas to the burner.

Referring to the drawing, the numeral 8 indicates a water boiler or tank, 9 the inlet or supply pipe, 10 the hot water outlet or discharge pipe, 11 the water heater and 12 the burner thereof. A heater outlet pipe 13 connects the upper portion of the heater to the water boiler 8 and a heater inlet pipe 14 connects the lower portion of the heater with the lower portion of the water boiler 8. The improved water heater controller 15 is connected to the pipe 14 between the boiler 8 and the heater 11 and is provided with a wire or other connection 16 extending to the arm 17 of a manually actuated control 18 located at a distant point. Said controller is provided with an operating handle 19 and a dial 20 having a scale thereon for indicating the degree of heat desired. The controller 15 comprises the tubular portion 21 which intersects the pipe 14 and carries an upper arm 22 and a lower arm 23. A valve 24 closing the lower portion of the tubular member 21 is provided with a spring closed valve member 25 having an outwardly projecting stem 25' for moving the same. Gas is supplied to said valve through the pipe 26 and a pipe 27 controlled by the said valve extends to and supplies gas to the burner 12. Another pipe 28 connected to the valve 24 and extending upwardly alongside of the heater 11 is provided with a medial opening 29 which coincides with an opening 11' in the lower portion of the casing of the heater and forms a pilot light for the burner 12 of said heater. The pipe 28 receives gas constantly from the valve 24 and the said pipe is provided with a needle valve 30 for controlling the flow of gas to the pilot light opening. Said pipe 28 throughout its length also serves as a thermostat for stopping the constant supply of gas to the burner when the pilot light is not burning. The upper end of said thermostatic pipe 28 is pivotally connected to the short end of a lever 31 medially fulcrumed on one end of the arm 22. The long end of this lever 31 is adapted to engage a bell crank hook lever 32 also fulcrumed on the arm 22 and which will be more fully described later.

A bar 33 slidably guided in the arms 22 and 23 is provided with a weight 34 for normally holding it in its lower or off position, and is also provided with a spring 35 interposed between the arm 22 and a transverse pin 36 mounted in the upper portion of the bar 33 to cushion the blow when the bar is dropped. Said bar is provided with laterally extending rack teeth 37 which increase in length or depth transversely of the bar toward the lower end of the bar as clearly shown in Figs. 1 and 2. The variations in transverse length or depth of these teeth provide for heating the water to various temperatures. The bell crank hook lever 32, before mentioned, works in conjunction with the rack teeth and its hook portion 32' is adapted to engage any one of the teeth and hold up the bar until the water reaches the predetermined temperature. A coiled spring 38 normally holds the hook portion 32' of the lever in engagement with the edge portion of the bar so that when said bar is pulled upwardly the hook will snap under the desired tooth and hold the bar in adjusted position until it is automatically released by the temperature of the water flowing through the tubular part 21.

Positioned within the tubular portion 21 and of less diameter than said portion, is a tube 39 of slight expansibility which is threaded into the upper end of the tubular member and also into the arm 22 while the lower end of said tube is suspended within said tubular portion and is closed by a fulcrum plug 40 having an upper annular fulcrum edge 41. Levers 42 fulcrumed on said annular edge have their shorter outer ends engaged by the lower end portions of an expansible tube 43 positioned within the tube 39 and bearing at its upper end against the arm 22. An expansible rod or tube 44 extends through the arm 22 and into the tube 43 and at its lower end is provided with a cap 45 which bears against the inner longer ends of the levers 42. The upper portion of the rod 44 carries a collar 44' and a coiled spring 46 encircling the said rod is interposed between the said collar and the arm 22 to yieldingly hold the rod in its lower position and the tube 43 in its upper position. Said rod or tube 44 projects upwardly from the arm 22 and immediately beneath an adjusting screw 47 threaded through the bell crank lever 32, so that the heat of the water circulating through the pipes 13, 14, the tubular portion 21 and the heater and the boiler will cause the tubes 39, 43 and the rod or tube 44 to expand and said rod 44 will engage the screw 47 of the lever 32 and force the hooked end of the lever out of engagement with the particular tooth engaged, and the rod 33 will drop by gravity to its lowermost position to turn off the main supply of gas, as will now be described.

The rod 33 at a point in horizontal alinement with the valve stem 25' is recessed to form a tooth 48 thereabove which is engaged by the free end of a pivoted arm 49 to limit the downward movement of the rod 33 and to position the said arm with relation to the valve stem which is engaged by the arm. Said recess is formed with an inclined edge 48' to force the arm 49 to the left and the valve 25 to open position and said valve will be held in said open position by engagement of the arm with the side edge portion 33' of the bar when the bar is raised. The interposition of the arm 49 between the bar 3 and the valve stem 25' provides for substantially a straight line pressure on the valve stem. When the valve is open the gas from the pipe 26 will flow through the valve and the pipe 27 to the burner 12.

The tooth 48 projects outwardly beyond the other teeth and coacts with the hooked end of the bell crank lever when the gas is turned on and it is desired to manually close it off. This function is accomplished by turning the pointer of the arm 19 upwardly to off position to raise the bar 33 so that its tooth 48 will engage the lower beveled edge of the hook 32' and force it away from the teeth 37 to a position so that the notch 50 of the pivoted arm 51 will engage the transverse pin 52 of the bell crank lever and held its hooked end out of engagement with the teeth 37. When thus engaged the pointer of the arm 19 is swung downwardly to drop the bar 33, and when said bar has almost reached its lowermost position, a transverse pin 53 on said bar will strike the pivoted arm 51 and swing it downwardly to disengage the pin 52 and permit the bell crank lever to swing to normal position. The downward movement of the bar will, of course, close off the gas to the burner as before mentioned. A spring 54 yieldingly holds the pivoted arm 51 in its upper position.

In the event that the pilot light is accidentally extinguished and the main gas supply is turned on, a dangerous condition will arise, and to overcome this the lever 31 before mentioned is provided. The long end of said lever 31 extends beneath the upper arm of the bell crank lever 32 and an adjustable screw 55 carried by said lever 32 is engaged by the lever 31 to swing the hooked end of the lever away from the bar 33 so it cannot engage the teeth thereof and thus prevent the main supply gas valve from being held in open position. While the pilot light is burning the tube 28 will be heated and expanded and will swing the short end of the lever 31 upwardly and the long end downwardly away from the bell crank lever, but when the pilot light is extinguished the tube 28 will contract and swing the long end of the lever 31 into engagement with the bell crank lever and prevent the gas valve from being maintained in open position.

It is desirable at times to only heat a small quantity of water, whereas boilers as ordinarily constructed provide for circulating all of the water in the boiler through the heater, regardless of the amount required, with the result that a long period of time is required to heat a small quantity of water. To obviate this, a thermostatically controlled loop pipe 56 is provided which is connected to the pipe 14 and to a pipe 57 connected to the upper portion of the boiler a slight distance below the pipe 13. The loop pipe 56 comprises a valve casing 58 provided with a valve seat 59 controlling the flow of water through the pipe 14 to the boiler, and also provided with a valve seat 60 controlling the flow of water through the pipe 57 to the boiler. A valve stem 61 extends through both valve seats and is provided with an upper valve 62 controlling the seat 60 and a lower valve 63 controlling the seat 59. A coiled spring 64 encircles the lower end of the valve stem and is interposed between the valve 63 and an adjusting screw or bolt 65 threaded through the lower end of the valve casing. Said spring normally holds the valve 63 closed and the valve 62 in open position so that in first heating the water, the flow will be through the pipe 57. The portion of the loop enclosing the thermostat is in the form of an inverted U and in the horizontal portion 56' thereof a lever 66 is fulcrumed and its longer end carries a pivoted pointed member 67 which engages the upper end of an expansible rod 68 interposed between the valve 62 and the pointed member 67. Another expansible rod 69 is threaded through the other end of the U-shaped tube 56 and at its upper end bears against the pointed end of a pointed member 70 pivoted to the short end of the lever 66.

As thus constructed the water first heated will pass through the U-shaped tube leading to the upper portion of the boiler so that the water only in the upper portion of the boiler will be circulated back and forth through the heater. As the temperature of the water increases, the thermostatic rods 68 and 69 will expand and move the valves 62 and 63 downwardly, closing the valve seat 62 and opening the valve seat 59 and thereby causing the water to circulate through the pipe 14 to the lower portion of the boiler to heat all of the water in the boiler. Pipes 70 and 71 connected respectively to the pipes 57 and 14 are adapted to be connected to a furnace or other heating means, if desired.

From the foregoing description it will be seen that the automatic water heater controller permits the easy control of the heater from a distant point and when a desired temperature has been reached, the gas to the heater will be automatically closed off. It will be further seen that the device provides for the heating of a small amount of water quickly.

What I claim as my invention is:

1. An automatic water heater controller, comprising a water heater having a gas burner and means for lighting the same, a boiler and a controller to which the water pipes of the heater are connected to provide a back and forth circulation of water from the heater to the boiler and through the controller, a thermostatic means controlled by the temperature of the circulated water for stopping the supply of gas to the burner when the temperature of the water flowing through the controller reaches a predetermined degree, means indicating different temperatures and easily operable from a distant point for selecting the degree of temperature at which the supply of gas to the burner will be stopped, and a pilot light thermostatic means coacting with the first mentioned thermostatic means and the distant point operating means for stopping the supply of gas to the burner when the lighting means is not in operation.

2. An automatic water heater controller, comprising a water heater having a gas burner and means for lighting the same, a boiler and a controller to which the water pipes of the heater are connected to provide a back and forth circulation of water from the heater to the boiler and through the controller, a thermostat positioned within the controller and responsive to the temperature of the circulating water, a valve for controlling the supply of gas to the burner, a mechanism including a rack bar interposed between the thermostat and the valve for actuating the valve, and means indicating different temperatures and easily operable from a distant point for setting the mechanism to respond to a selected water temperature flowing through the regulator and close the gas valve when said temperature has been reached.

3. An automatic water heater controller, comprising a water heater having a gas burner and means for lighting the same, a boiler and a controller to which the water pipes of the heater are connected to provide a back and forth circulation of water from the heater to the boiler and through the controller, a thermostat positioned within the controller and responsive to the temperature of the circulating water, a valve for controlling the supply of gas to the burner, a rack bar for controlling the gas valve, a pivoted member releasably holding the rack bar in selective positions and movable by the thermostat to release said bar, and means indicating different temperatures and easily operable from a distant point for moving the rack bar to a selected position.

4. An automatic water heater controller, comprising a water heater having a gas burner and a pilot light member, a boiler to which the water pipes of the heater are connected to provide a back and forth circulation of water from the heater to the boiler, a thermostat positioned within and responsive to the temperature of the circulating water, a valve controlling the supply of gas to the burner, a rack bar for controlling the gas valve, a pivoted member releasably holding the rack bar in selective positions and movable by the thermostat to release the bar, said pivoted member also being responsive to expansion of the pilot light member, and means operable from a distant point for moving the rack bar to a selected position.

5. An automatic water heater controller, comprising a water heater having a gas burner and an expansible pilot light member, a boiler, pipes connecting the heater to the boiler to provide a back and forth circulation of water from the heater to the boiler, a thermostat positioned within one of the pipes and responsive to the temperature of the water circulating therethrough, a valve controlling the supply of gas to the burner, a rack bar positioned to open the gas valve by a longitudinal movement of said bar, a pivoted member releasably holding the bar in selected positions and in any one of which the gas valve is held in open position, said pivoted member being actuated by the thermostat to release the rack bar and permit it to close the gas valve when the temperature of the circulated water reaches the selected degree, said pivoted member being movable to an inoperative position by the expansible pilot light member in the event the pilot light is extinguished, and means operable from a distant point for moving the rack bar to a selected position.

6. An automatic water heater controller, comprising a water heater having a gas burner, a boiler, pipes connecting the heater to the boiler to provide a back and forth circulation of water from the heater to the boiler, a thermostat positioned in one of the pipes and having a portion projecting outwardly from said pipe, a normally closed valve controlling the supply of gas to the burner, a rack bar positioned adjacent the gas valve and having an angular edge portion for moving the gas valve to open position when said rod is raised, the teeth of said rack bar increasing in depth toward the lower end of the rod, a pivoted bell crank lever having a hooked portion engageable with the teeth for releasably holding the bar in an upper selected position, one portion of the bell crank lever being engageable by the projecting portion of the thermostat to cause it to release the bar when the selected water temperature has been reached, and means operable from a distant point for moving the bar to a position where a selected tooth will be engaged by the hooked portion of the bell crank lever.

7. An automatic water heater controller, comprising a water heater having a gas burner and an expansible pilot light member, a boiler, pipes connecting the heater to the boiler to provide a back and forth circulation of water from the heater to the boiler, a thermostat positioned in one of the pipes and having a portion projecting outwardly from said pipe, a normally closed valve controlling the supply of gas to the burner, a rack bar positioned adjacent the gas valve and having an angular edge portion for moving the gas valve to open position when said rod is raised, the teeth of said rack bar increasing in depth toward the lower end of the rod, a pivoted bell crank lever having a hooked portion engageable with the teeth for releasably holding the bar in an upper selected position, one portion of the bell crank lever being engageable by the projecting portion of the thermostat to cause it to release the bar when the selected water temperature has been reached, said bell crank lever also being engageable by the pilot light member and movable thereby to an inoperative position when the pilot is extinguished, and means operable from a distant point for moving it to a position where a selected tooth will be engaged by the hooked portion of the bell crank lever.

8. An automatic water heater controller, comprising a water heater having a gas burner, and an expansible pilot light member, a boiler, pipes connecting the heater to the boiler to provide a back and forth circulation of water from the heater to the boiler, a thermostat positioned in one of the pipes and having a portion projecting outwardly from said pipe, a normally closed valve controlling the supply of gas to the burner, a rack bar positioned adjacent the gas valve and having an angular edge portion for moving the gas valve to open position when said rod is raised, the teeth of said rack bar increasing in depth toward the lower end of the rod, a pivoted bell crank lever having a hooked portion engageable with the teeth for releasably holding the bar in an upper selected position, one portion of the bell crank lever being engageable by the projecting portion of the thermostat to cause it to release the bar when the selected water temperature has been reached, a lever engaged by the expansible pilot light member and movable thereby to engage and move the bell crank lever to an inoperative position when the pilot light is extinguished, and means operable from a distant point for moving the rack bar to a position where a selected tooth will be engaged by the hooked portion of the bell crank lever.

In testimony whereof I affix my signature.

ALFRED WILD.